S. W. MUDGE.
Churn.
No. 33,659.  Patented Nov. 5, 1861.
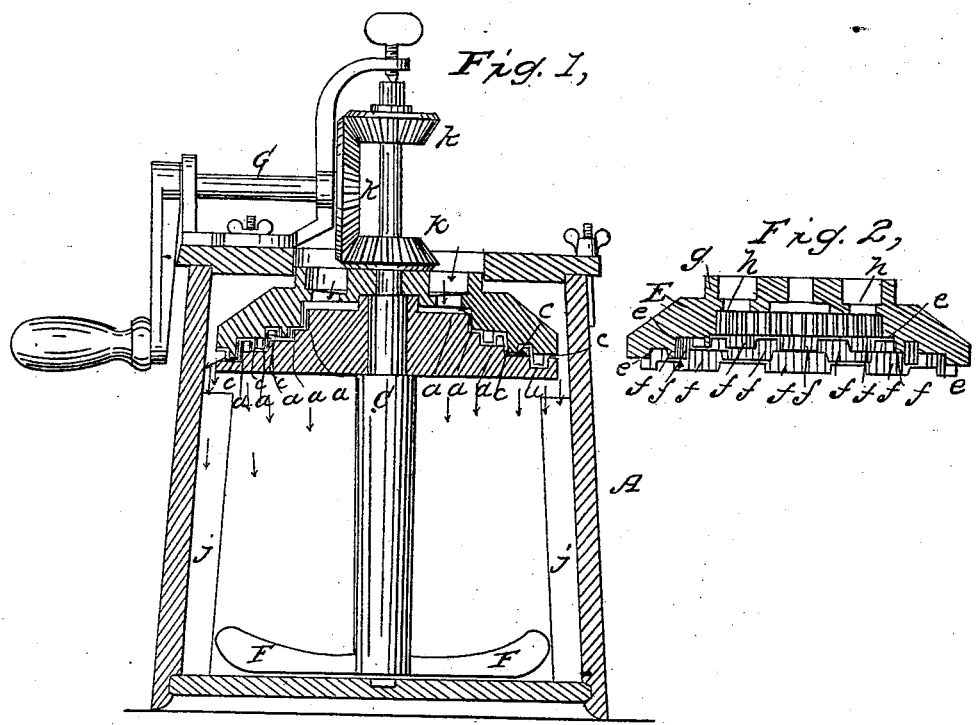
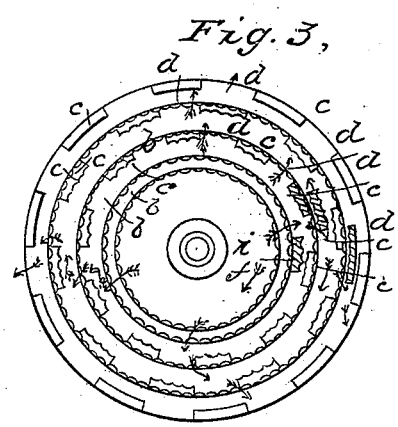
WITNESSES:
INVENTOR:

UNITED STATES PATENT OFFICE.

SAMUEL W. MUDGE, OF ROME, NEW YORK.

IMPROVED CHURN.

Specification forming part of Letters Patent No. 33,659, dated November 5, 1861.

*To all whom it may concern:*

Be it known that I, SAMUEL W. MUDGE, of Rome, in the county of Oneida and State of New York, have invented a new and Improved Churn; and I do hereby declare that the following is a full, clear, and exact description of the same, reference being had to the annexed drawings, making a part of this specification, in which—

Figure 1 is a vertical central section of my invention. Fig. 2 is a detached central section of the upper beater pertaining to the same; Fig. 3, a detached plan or top view of the lower beater; Fig. 4, an enlarged section of the upper and lower beaters, showing their action on the milk or cream.

Similar letters of reference indicate corresponding parts in the several figures.

This invention relates to an improvement in that class of churns in which the butter is produced by releasing the butter contained in the butter globule from its investment in a direct manner by abrasion, friction, or agitation, or all combined, and separating the same from the milk or cream.

The object of the invention is to effect the liberation of the butter from the sacks or investments of the butter globules in a very expeditious manner, and at the same time without injuring the grain of the butter by crushing or in any degree disturbing the globular formation of the butter as it exists in the globule.

To enable those skilled in the art to fully understand and construct my invention, I will proceed to describe it.

A represents a tub or receptacle, which may be of conical form and constructed of wood or other suitable material and provided with a lid B, secured to it in any proper way. C is a vertically-rotating shaft, which is placed centrally in the tub A and extends some distance above the lid B, the latter having a circular opening $a^\times$ at its center, through which the shaft C passes.

On the shaft C and just below the lid B there is permanently secured or keyed a circular beater-plate D, which has a series of concentric step-like projections $a$ extending from its periphery to a point about midway between the periphery of the plate D and shaft C. The upper surfaces of the projections $a$ are smooth; but their sides are fluted, as shown at $b$ in Figs. 3 and 4, and the three outermost projections $a$ have vertical beaters $c$ on them, the beaters of each projection being placed at suitable and equal distances apart, and the beaters $c$ of one projection being opposite the spaces $d$ between the beater of its adjoining projection, as shown clearly in Fig. 3.

The beaters $c$ are fluted at both sides, with the exception of those at the outermost projection $a$. The latter may have smooth sides, as shown in Fig. 3.

On the shaft C, directly above the beater-plate D, there is placed loosely a similar plate E. The plate E corresponds inversely with the plate D, as fully shown in Fig. 1, the step-like projections $e$ and beaters $f$ corresponding with those of the lower plate, the beaters of each plate just clearing the surface of its fellow or opposite plate. The sides of the projections $e$ are fluted the same as the sides of the projections $a$.

The beater-plate E is provided on its upper surface with a concentric annular ledge $g$, which fits within the circular opening $a^\times$ of the lid B. The plate E within the ledge $g$ is perforated with holes $h$, and the plate E rests at its center on a central hub $i$ of plate D.

To the shaft C, at its lower end, there are attached arms F F, which serve as gatherers, and upright ribs or bars $j$ are attached to the inner sides of the tub A to assist the gathering operation.

The beater-plates may be constructed of sheet metal, at least that would be the preferable material, and the two plates are rotated in reverse directions by the gearing $k$, G being the driving-shaft.

The operation is as follows: The shaft G is rotated by hand or any convenient power, and the milk or cream is allowed to flow on the upper surface of the plate E and within the ledge $g$, the milk or cream passing through the perforations $h$ and between the two beater-plates. In passing between the plates D E the globules or sacks containing the butter are subjected to a rolling or abrading action between the fluted surfaces which form the sides of the step-like projections $a$ $e$, as will be fully understood by referring to Fig. 4, and in passing over the outer projections *a e*, which are provided with beaters *c f*, the globules or sacks are subjected to a combined rubbing and rolling action and a beating one, and as the milk or cream passes from between the plates D E the sacks or globules will all be ruptured and the butter liberated, so that the arms F F, assisted by the ribs or bars *j*, will gather the butter. By this arrangement the coverings or investments of the butter-globules will be removed and the butter contained therein set free without being subjected to an undue action and the grain of the butter injured, a contingency which renders butter oily and insipid.

Having thus fully described my invention, what I claim, and desire to secure by Letters Patent, is—

The plates D and E, dasher F, and ribs J J, when all shall be constructed, arranged, and operated in the manner and for the purpose specified.

SAMUEL W. MUDGE.

Witnesses:
 L. E. ELMER,
 JNO. P. VAN VLECK.